United States Patent
Sheelvant et al.

(10) Patent No.: US 12,430,062 B2
(45) Date of Patent: Sep. 30, 2025

(54) MANAGING TRANSITIONS FROM METRO-CLUSTER TO STANDALONE OBJECTS

(71) Applicant: Dell Products L.P., Round Rock, TX (US)

(72) Inventors: Girish Sheelvant, Hopkinton, MA (US); Dmitry Nikolayevich Tylik, Westborough, MA (US); Patricia B. Campbell, Franklin, MA (US); Carole Gelotti, Nashua, NH (US); Binbin Liu Lin, Sudbury, MA (US); Lalitha Natarajan, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 372 days.

(21) Appl. No.: 17/974,635

(22) Filed: Oct. 27, 2022

(65) Prior Publication Data

US 2024/0143218 A1    May 2, 2024

(51) Int. Cl.
   *G06F 3/06*      (2006.01)
(52) U.S. Cl.
   CPC .......... *G06F 3/0655* (2013.01); *G06F 3/0604* (2013.01); *G06F 3/067* (2013.01)

(58) Field of Classification Search
   CPC ...... G06F 3/0655; G06F 3/0604; G06F 3/067; G06F 3/0646; G06F 3/0629; G06F 3/0634; G06F 3/0635; G06F 3/0683
   See application file for complete search history.

(56) References Cited

U.S. PATENT DOCUMENTS

| | | | |
|---|---|---|---|
| 9,378,219 B1 | 6/2016 | Bono et al. | |
| 11,513,684 B1* | 11/2022 | Tylik | G06F 3/0644 |
| 11,675,673 B2* | 6/2023 | Meiri | G06F 3/0673 |
| | | | 714/19 |
| 2022/0229591 A1 | 7/2022 | Tylik et al. | |
| 2022/0236877 A1 | 7/2022 | Haravu et al. | |
| 2022/0236923 A1 | 7/2022 | Tylik et al. | |

\* cited by examiner

*Primary Examiner* — Tim T Vo
*Assistant Examiner* — Richard B Franklin
(74) *Attorney, Agent, or Firm* — BainwoodHuang

(57) ABSTRACT

A technique is disclosed for ending metro-clustering on metro volumes. The technique includes collecting a plurality of metrics that indicate respective characteristics associated with a metro volume. In response to receiving a request to end metro on the metro volume, the technique includes comparing the plurality of metrics with a database that associates multiple permutations of metrics with respective procedures for ending metro. The technique further includes identifying, based on the comparison, a target procedure having a permutation of metrics that matches the plurality of metrics and implementing the target procedure.

20 Claims, 5 Drawing Sheets

MANAGING TRANSITIONS FROM METRO-CLUSTER TO STANDALONE OBJECTS

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Some data storage systems, also called "arrays," provide data access using metro clusters. "Metro clusters" are storage deployments in which two volumes hosted from respective arrays at respective sites are synchronized and made to appear as a single volume to application hosts. Such volumes are sometimes called metro or "stretched" volumes because they appear to be stretched between two arrays. Primary advantages of metro clusters include increased data availability, disaster tolerance, resource balancing across datacenters, and storage migration.

Sometimes, an administrator or other user of a metro-cluster may wish to transition a metro volume to a standalone volume or pair of volumes. The desire to end metro clustering may be entirely voluntary, such as because the benefits of metro clustering are no longer needed, or it may arise because of various faults, such as broken network connections, disaster scenarios, errors, or other circumstances. Normally, administrators rely on their own expertise for ending metro clustering in an orderly manner.

SUMMARY

Unfortunately, administrators are not always consistent in their activities and can sometimes make errors when transitioning a metro volume to one or more standalone volumes. Risks of data loss and corruption are possibilities if proper steps are not taken. Such risks can discourage parties from adopting metro-cluster solutions and may lead to a false impression that metro clusters are too complicated for small and medium-sized organizations, which may lack full time administrators. What is needed, therefore, is a way of reducing risks associated with ending metro clustering, so that data loss and corruption are avoided and users can administer their metro clusters with greater confidence.

The above need is addressed at least in part by an improved technique for ending metro-clustering on metro volumes. The technique includes collecting a plurality of metrics that indicate respective characteristics associated with a metro volume. In response to receiving a request to end metro on the metro volume, the technique includes comparing the plurality of metrics with a database that associates multiple permutations of metrics with respective procedures for ending metro. The technique further includes identifying, based on the comparison, a target procedure having a permutation of metrics that matches the plurality of metrics and implementing the target procedure.

Advantageously, the improved technique simplifies the task of ending metro on a metro volume and reduces or eliminates the associated risks of data loss and corruption. Rather than relying on the administrator's expertise in performing every step perfectly of an end-metro procedure, the improved technique instead operates based on pre-defined, known-good procedures specifically selected based on current circumstances. Preferably, selected procedures are performed automatically, thus further simplifying activities and reducing risks.

Certain embodiments are directed to a method of ending metro-clustering on a metro volume. The method includes receiving an end-metro request directed to the metro volume, collecting a plurality of metrics that indicate respective characteristics associated with the metro volume, and, in response to receiving the end-metro request, (i) comparing the plurality of metrics with a database that associates multiple permutations of metrics with respective procedures for ending metro, (ii) identifying, based at least in part on the comparison, a target procedure having a permutation of metrics that matches the plurality of metrics, and (iii) performing the identified target procedure.

Other embodiments are directed to a computerized apparatus constructed and arranged to perform a method of ending metro-clustering on a metro volume, such as the method described above. Still other embodiments are directed to a computer program product. The computer program product stores instructions which, when executed on control circuitry of a computerized apparatus, cause the computerized apparatus to perform a method of ending metro-clustering on a metro volume, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for ending metro-clustering on metro volumes includes collecting a plurality of metrics that indicate respective characteristics associated with a metro volume. In response to receiving a request to end metro on the metro volume, the technique includes comparing the plurality of metrics with a database that associates multiple permutations of metrics with respective procedures for ending metro. The technique further includes identifying, based on the comparison, a target procedure having a permutation of metrics that matches the plurality of metrics and implementing the target procedure.

Target procedures are preferably performed automatically by an array that participates in the metro cluster. Performing a target procedure may include executing certain acts locally as well as directing a remote array to execute certain other acts remotely, assuming the other array is available. The task of the administrator is thus greatly simplified, as is the likelihood of errors.

Figure 1:
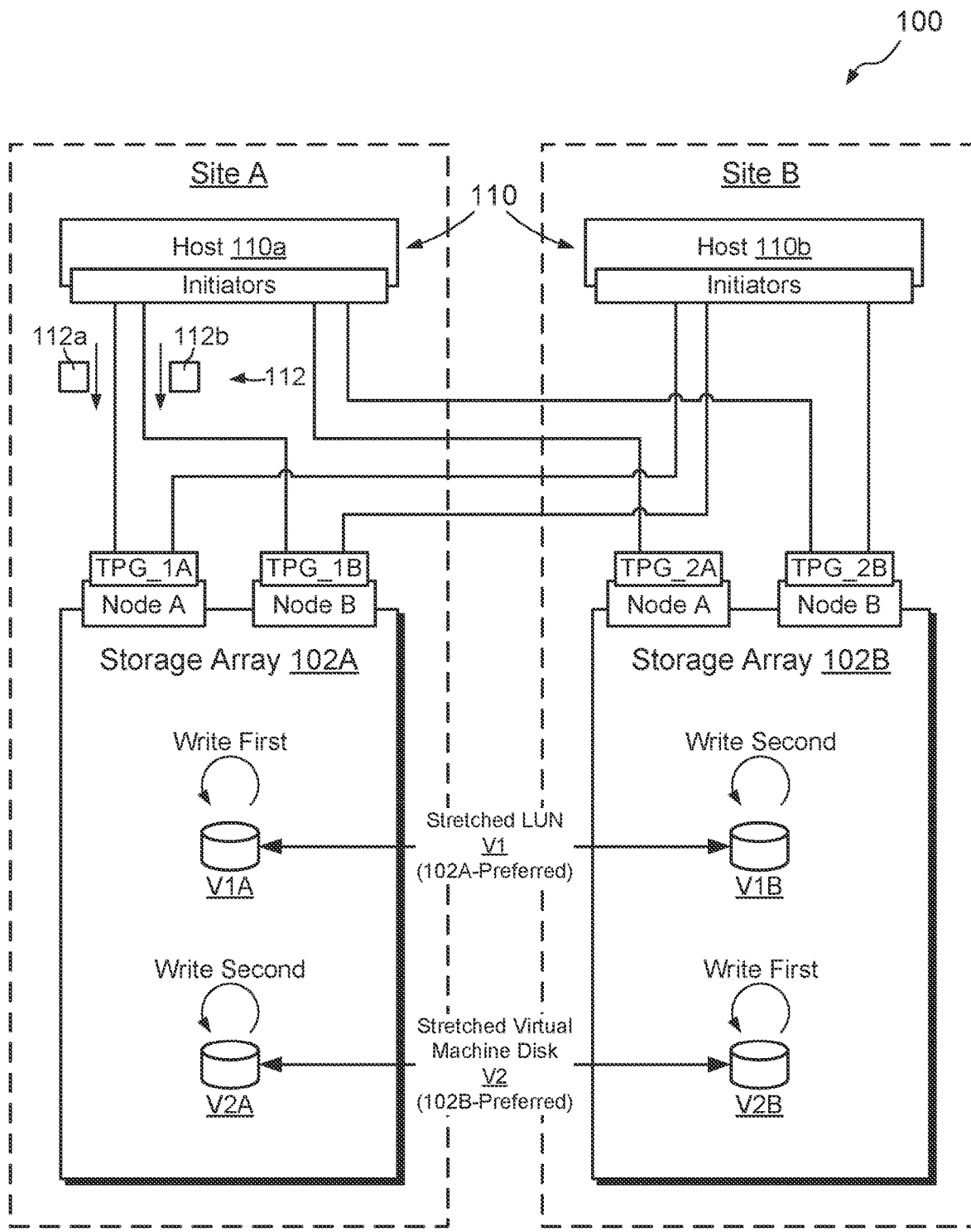
FIG. 1 is a block diagram of an example metro-cluster environment in which embodiments of the improved technique can be practiced.

FIG. 1 shows an example metro-cluster environment 100 in which embodiments of the improved technique can be practiced. Here, a first array 102A operates at Site A and a second array 102B operates at Site B. Each array 102 may include one or more storage computing nodes (e.g., Node A and Node B) as well as persistent storage, such as magnetic disk drives, solid state drives, and/or other types of storage drives. Site A and Site B may be located in different data centers, different rooms within a data center, different locations within a single room, different buildings, or the like. Site A and Site B may be geographically separate but are not required to be. Generally, to meet customary metro cluster requirements, Site A and Site B may be separated by no more than 100 km.

Environment 100 further includes hosts 110 (e.g., host 110a and host 110b). Hosts 110 run applications that store their data on Array 102A and/or Array 102B. The hosts 110 may connect to arrays 102 via a network, such as a storage area network (SAN), a local area network (LAN), a wide area network (WAN), the Internet, and/or some other type of network or combination of networks, for example.

Each array 102 is capable of hosting multiple data objects, such as host-accessible LUNs (Logical UNits), file systems, and virtual machine disks, for example, which the array may store internally in the form of "volumes." Internal volumes may also be referred to as LUNs, i.e., the terms "volume" an "LUN" may be used interchangeably herein when referring to internal representations of data objects. Some hosted data objects may be "stretched," meaning that they are deployed in a metro-cluster arrangement in which they are accessible from both arrays 102A and 102B, e.g., in an Active/Active manner, with their contents being maintained in synchronization. For example, volume V1 may represent a stretched LUN and volume V2 may represent a stretched virtual machine disk. Environment 100 may present each stretched data object to hosts 110 as a single virtual object, even though the virtual object is maintained internally as a pair of objects, with one object of each pair residing on each array. In the example shown, stretched volume V1 (a LUN) resolves to a first volume V1A in array 102B and a second volume V1B in array 102B. Likewise, stretched volume V2 (a virtual machine disk) resolves to a first volume V2A in array 102A and a second volume V2B in array 102B. One should appreciate that each of the arrays 102A and 102B may host additional data objects (not shown) which are not deployed in a metro-cluster arrangement and are thus local to each array. Thus, metro clustering may apply to some data objects in the environment 100 but not necessarily to all.

As further shown, each array 102 may be assigned as a "preferred array" or a "non-preferred array." Preference assignments are made by arrays 102 and may be automatic or based on input from an administrator, for example. In some examples, array preferences are established on a per-data-object basis. Thus, for stretched LUN (V1), array 102A may be assigned as the preferred array and array 102B may be assigned as the non-preferred array. The reverse may be the case for stretched vVol (V2), where array 102B may be assigned as preferred and array 102A as non-preferred.

Assignment of an array as preferred or non-preferred determines how synchronization is carried out across the two arrays. For example, when a write request to a data object is received (e.g., from one of the hosts 110), the preferred array for that data object is always the first array to persist the data specified by the write request, with the non-preferred array being the second array to persist the data. This is the case regardless of whether the preferred array or the non-preferred array is the one that receives the write request from the host. Thus, a first write request received by the preferred array is written first to the preferred array, but also a second write request received by the non-preferred array is written first to the preferred array. One way of understanding preferred and non-preferred arrays is that a preferred array is the one that users prefer to remain available in the event of a loss of connectivity between the two arrays.

As a particular example, assume that Host 110a issues an I/O request 112a specifying a write of host data to the stretched LUN (V1), with array 102A being the target. Array 102A receives the write request 112a and checks whether it is preferred or non-preferred for the referenced data object, stretched LUN V1. In this example, array 102A is preferred, so Array 102A persists the data first ("Write First"), by writing to V1A. Only after such data are persisted on array 102A does array 102A replicate the write request 112a to array 102B, which then proceeds to "Write Second" to V1B.

But assume now that Host 110a issues an I/O request 112b specifying a write of host data to the stretched virtual machine disk (V2), again with array 102A being the target. Array 102A receives the write request and checks whether it is preferred or non-preferred for the stretched virtual machine disk. In this case, array 102A is non-preferred, so array 102A forwards the write request 112b to array 102B (preferred), which proceeds to "Write First" to V2B. Only after array 102B has persisted this data does array 102B send control back to array 102A, which then proceeds to "Write Second" to V2A.

Although both examples above involve array 102A being the target of the write requests 112a and 112b, similar results follow if array 102B is the target. For example, if request 112a arrives at array 102B, array 102B determines that it is non-preferred for V1 and forwards the request 112a to array 102A, which would then write first to V1A. Only then does request 112a return back to array 102B, which writes second to V1B. As for write request 112b, array 102B determines that it is preferred and writes first to V2B, and then forwards the request 112b to array 102B, which then writes second to V2A.

The disclosed protocol of writing first to the preferred array brings many benefits. As the array preference for any data object is known in advance, it is assured that the preferred array always stores the most up-to-date data. If a link between the arrays fails or the data on the two arrays get out of sync for any reason, it is known that the most recent data can be found on the preferred array. Additional information about metro clusters employing a write-first protocol for preferred arrays may be found in copending U.S. publication number US/20220236877, filed Jan. 22, 2021, the contents and teachings of which are incorporated herein by reference in their entirety.

Figure 2:
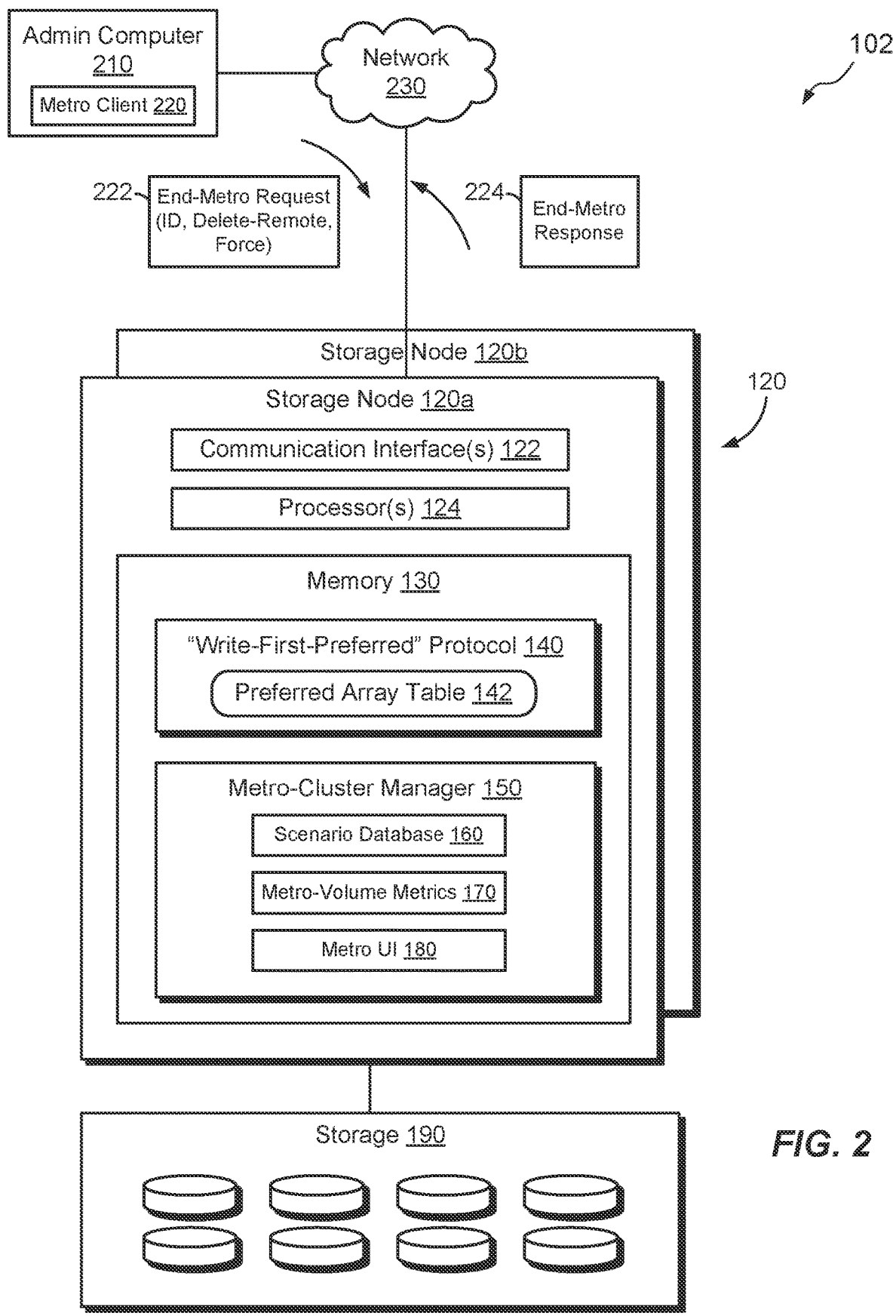
FIG. 2 is a block diagram of an example array of the metro-cluster environment of FIG. 1.

FIG. 2 shows an example arrangement of a storage array 102 of FIG. 1 in greater detail. Array 102 may be representative of array 102A and array 102B. There is no requirement that the two arrays 102A and 102B be identical, however.

Array 102 is seen to include a pair of storage nodes 120 (i.e., 120a and 120b; also called storage processors, or "SPs"), as well as storage 190, such as magnetic disk drives, electronic flash drives, and/or the like. Nodes 120 may be provided as circuit board assemblies or blades, which plug into a chassis that encloses and cools the nodes 120. The chassis has a backplane or midplane for interconnecting the nodes, and additional connections may be made among nodes using cables. In some examples, nodes 120 are part of a storage cluster, such as one which contains any number of storage appliances, where each appliance includes a pair of nodes 120 connected to shared storage devices. No particular hardware configuration is required, however.

As shown, node 120a includes one or more communication interfaces 122, a set of processors 124, and memory 130. The communication interfaces 122 include, for example, SCSI target adapters and/or network interface adapters for converting electronic and/or optical signals received over a network to electronic form for use by the node 120a. They may further include, in some examples, NVMe-oF (Nonvolatile Memory Express over Fabrics) ports. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 2, the memory 130 "includes," i.e., realizes by execution of software instructions, a write-first-preferred protocol 140 and a metro-cluster manager 150. The write-first-preferred protocol 140 is configured to manage tasks associated with writing first to preferred arrays and writing second to non-preferred arrays, and thus helps to avoid deadlocks and maintain synchronization of data objects across the metro-cluster environment 100. In some examples, the write-first-preferred protocol 140 includes a preferred array table 142, e.g., a data structure that assigns data objects hosted by the local array 102 to corresponding preferred arrays and, in some cases, to corresponding non-preferred arrays (e.g., if not implied). Contents of the preferred array table 142 may be established by the node 120a based on input from a system administrator or automatically, e.g., based on any desired criteria, such as load distribution, location of arrays and/or hosts, network topology, and the like. In some examples, preferred array table 142 is replicated across arrays 102, such that all involved arrays have the same table of assignments.

The metro-cluster manager 150 is configured to manage metro volumes in the environment 100. Managing metro volumes may include, among other things, providing features for supporting end-metro functionality. To this end, the metro-cluster manager 150 may include a scenario database 160, metro-volume metrics 170, and a metro user interface (UI) 180.

The scenario database 160 is configured to associate multiple permutations (scenarios) of criteria relevant to metro volumes with respective procedures for ending metro. The scenario database 160 thus provides a vehicle for identifying appropriate end-metro procedures based on scenario.

The metro-volume metrics 170 include metrics specific to particular metro-volumes hosted by the array 102. In an example, metro-volume metrics 170 change over time as circumstances change, e.g., to reflect changing conditions of metro volumes, to include new metro volumes, to remove deleted metro volumes, and to remove metro volumes that have been changed to standalone volumes.

The metro UI 180 is configured to provide a user interface of the metro-cluster manager 150, for enabling administrators and other users to manage metro volumes. For example, a user may log onto the cluster manager 150 from a separate admin computer 210, which is connected to the array 102 via a network 230. The admin computer 210 may run a metro client 220, which is configured to communicate with the metro manager 150 using the metro UI 180. In an example, the metro UI 180 includes a GUI (graphical user interface) as part of a web application, and the metro client 220 includes a browser, which downloads and displays pages of the GUI. Alternatives to a GUI may include a CLI (command line interface) and/or a REST (representational state transfer) API (application programming interface), for example. In some examples, the metro-cluster manager 150 provides all three types of user interfaces. Although a separate admin computer 210 is shown, this is merely an example. For instance, the array 102 may include its own local terminal that performs similar functions.

In example operation, a user desires to convert a metro-volume to a standalone volume or to a pair of standalone volumes. Assume, for purposes of illustration, that the metro-volume to be converted is metro-volume V1 of FIG. 1. Assume further that the array of FIG. 2 is array 102A, which hosts the first volume V1A, and that array 102B hosts the second volume V1B. The user may wish to convert the metro volume V1 for any reason, such as because metro clustering is no longer needed on volume V1, because there has been a network outage, or for any other reason.

To begin the end-metro process, the user logs on to the metro-cluster manager 150, e.g., using the metro client 220 and the metro UI 180, and issues a request 222 on the UI to "end metro" on volume V1. The request 222 may include an identifier (ID) of the metro-volume to be converted, such as a name. Alternatively, the identity of the metro volume to be converted may be established based on context. For example, the user may be viewing properties of volume V1 when the user issues the request 222.

The request 222 may include various options, such as a "delete-remote" option and/or a "force" option. The delete-remote option, if selected, directs the metro-cluster manager 150 to delete the volume on the remote array, such as volume V1B on array 102B, after the metro volume has been converted. For example, the metro-cluster manager 150 may send a request to delete V1B to a similar metro-cluster manager running on a node 120 of array 102B, and that metro-cluster manager may respond by deleting the local volume V1B. In some examples, responding to the request to delete volume V1B includes deleting all snapshots of V1B.

The force option may be selected, for example, in cases wherein access to the remote array (e.g., 102B) is not currently possible, such as when a network connection is down between arrays 102A and 102B and activities can be performed only on the local array (102A). The force option allows end-metro activities to proceed unilaterally in such cases, despite the remote array being unreachable.

In response to receiving the end-metro request 222, the metro-cluster manager 150 may proceed to identify an appropriate procedure for ending metro given the current scenario. For example, the metro-cluster manager 150 accesses the metro-volume metrics 170 to obtain a plurality of metrics associated with the identified metro volume (V1). The metrics may include, for example, storage and network settings relevant to the volume V1, the status of bidirectional replication between the participating arrays, and the role of each array (preferred or non-preferred) in the metro volume. The plurality of metrics obtained for the metro volume from the metro-volume metrics 170 thus establishes a current scenario. The metro-cluster manager 150 then compares the plurality of metrics with the permutations (scenarios) identified in the scenario database 160 to identify a matching scenario and a corresponding target procedure that has been pre-defined for that scenario. The metro-cluster manager 150 then performs the identified target procedure.

The metro-cluster manager 150 preferably performs the identified target procedure automatically and without further user input. The particular activities performed by the identified target procedure vary from scenario to scenario. Some target procedures involve taking offline one of the volumes (e.g., V1A or V1B) of the metro volume (V1), while leaving the other volume online and continuing to process host I/O requests 112. An example procedure for taking offline a selected volume (e.g., V1A or V1B) may include the following actions:
  Delete a metro session on both arrays. May include first inducing a fractured state to end bi-directional replication between the first and second volumes (e.g., V1A and V1B).
  Disconnect all hosts 110 having access to the selected volume. For example, perform SCSI operations to disable all paths between host initiators and the selected volume.
  Change the SCSI identity of the selected volume, e.g., by assigning the selected volume a new WWN (worldwide name). The array may include software components for generating WWNs.
  Unassign the selected volume from any protection policy, e.g., to prevent any new snapshots from being made of the selected volume, e.g., as part of a regular snapshot schedule.

The above acts can be performed in any order. Once these acts have been completed, the metro-cluster manager 150 may send an end-metro response 224 back to the metro client 220. In an example, the response 224 is sent only after all the above acts have been completed successfully. If any of the acts cannot be completed, the response 224 may return a failure.

If, when issuing the end-metro request 222, the user selected the option to delete the remote volume, then deleting the remote volume and its snapshots may be included among the above acts. In such cases, the response 224 may be further held back until the remote volume and its snapshots have been deleted.

The above activities for taking the selected volume offline have the effect of isolating the selected volume and preventing further I/O to that volume from hosts 110. These activities provide a clean break between the selected volume and the other volume, which remains online.

One of the enabling features of a metro volume is that the first and second constituent volumes (e.g., V1A and V1B) are given the same SCSI identity, such that hosts 110 cannot generally distinguish them. Changing the SCSI identity thus breaks the metro-volume relationship, such that hosts 110 no longer recognize the constituent volumes as the same. The unselected volume that stays online may retain its original SCSI identity, such that hosts can continue to access the unselected volume without disruption, as if nothing had changed.

The act of changing the SCSI identity avoids data corruption, which could otherwise result if the two volumes were allowed to retain the same SCSI identity. By providing the selected volume with a new SCSI identity, it immediately becomes a different volume, which cannot be confused with the original.

The above act of disconnecting all hosts from the selected volume prevents immediate host access. Although an administrator may later try to reconnect the hosts, the selected volume would no longer have the same SCSI identity and thus could not be confused with the other volume.

In some examples, identifying the target procedure is based at least in part on the role of the array that receives the end-metro request 222, e.g., whether that array is preferred or non-preferred with respect to the metro-volume. For example, the proper procedure for taking a volume offline on a preferred array may be different from the proper procedure for taking a volume offline on a non-preferred array.

In some examples, the procedure for taking offline a volume on a preferred array may include switching roles of the preferred and non-preferred arrays with respect to the metro volume. For example, if the end-metro request 222 involves taking offline a remote volume on a preferred array, then the identified target procedure may change the preferred array to non-preferred (and the non-preferred to preferred), so that the volume taken offline is on the now non-preferred array.

In some examples, the end-metro response 224 provides a failure message when the user selects the option to delete the remote volume when the remote volume has more recent data than the local volume. Providing the failure message serves the objective of protecting the user from errors that could cause data loss. In such cases, the user may try the end-metro request 222 again, this time with the delete-remote option deselected.

Figure 3:
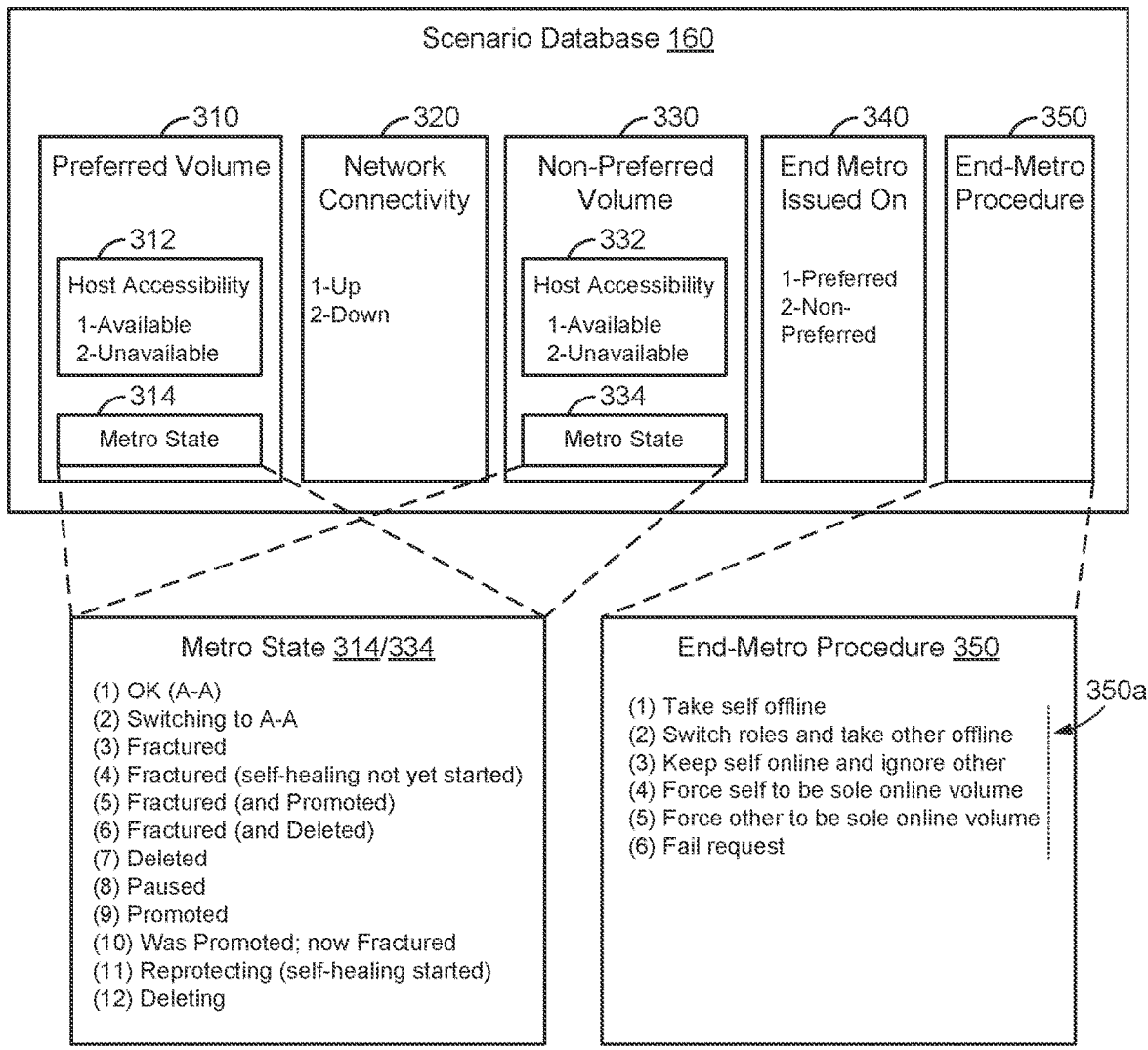
FIG. 3 is a block diagram of an example scenario database of FIG. 2.

FIG. 3 shows an example scenario database 160 in additional detail. The scenario database 160 associates different permutations of metrics with respective procedures for ending metro. Each permutation, or scenario, is defined as a respective combination of metrics. The metrics defining each scenario may include metrics related to the preferred volume 310, including host accessibility 312 (e.g., available or not available), and metro state 314, which can assume one of multiple values, examples of which are shown in the expanded view to the left below the main figure. The metrics defining each scenario may further include metrics for the non-preferred volume 330 (host accessibility 332 and metro state 334), as well as a metric indicating network connectivity 320, which may be "up" or "down." Up means that there is a functional network connection between the preferred and non-preferred sites, whereas down means that there is no working network connection. Finally, the metrics defining a scenario further include an indication 340 of which array (e.g., preferred or non-preferred) received the end-metro request 222. A particular scenario is thus defined as a combination of metrics selected from 312, 314, 320, 332, 334, and 340. In some examples, the particular scenario may be further defined by options that accompany the end-metro request 222, such as the above-described option to force an end metro when the remote array is unreachable.

Given the number of options depicted for the various metrics in FIG. 3, the total number of permutations is large. However, the number can be reduced given that some metrics are not independent from each other and some combinations of metrics may not be possible. Thus, the scenario database 160 preferably provides a respective end-metro procedure for every foreseeable combination of metrics, rather than for every possible combination.

FIG. 3 further shows specific examples of certain end-metro procedures (in the expanded view to the lower right). One should appreciate, though, that these are merely examples provided for illustration, as end-metro procedures can be diverse, and some procedures may involve multiple actions.

The various examples of metro states 314/334, shown to the lower left, are also diverse. Such states reflect the status of metro-cluster replication for the indicated volume ("A-A" refers to normal, Active-Active replication).

Figure 4:
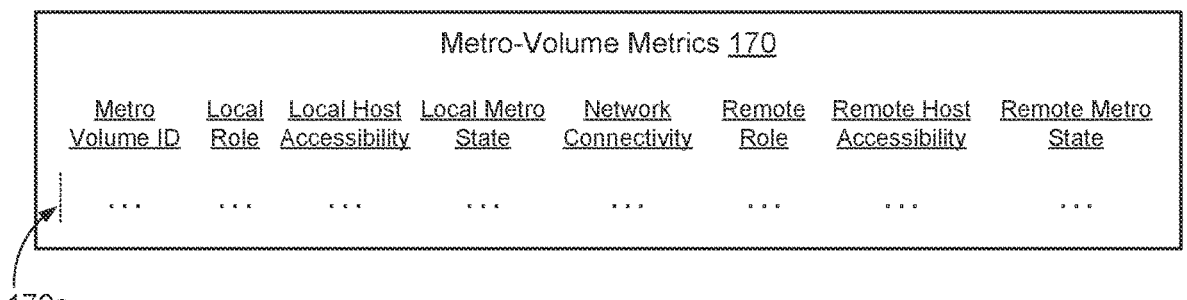
FIG. 4 is a block diagram of example metro-volume metrics of FIG. 2.

FIG. 4 shows example metro-volume metrics 170 of FIG. 2 in additional detail. In an example, the metro-volume metrics 170 include, for each metro volume supported in the array, current values of metrics for the respective metro volume. These current values of metrics align with a particular scenario defined in the scenario database 160, e.g., based on current values of metrics 170 aligning with values of metrics 312, 314, 320, 332, and 334. The value of metric 340 (the array that received the end-metro request 222), as well as options accompanying the request 222, are not part of the metro-volume metrics 170, as those metrics are not defined until the request 222 is issued.

A plurality of current metro-volume metrics 170a is provided for a particular metro volume, such as V1, and such plurality corresponds to a particular permutation of metrics (scenario) in the scenario database 160, once the array (340) is determined. Thus, in response to a metro request 222, the metro-cluster manager 150 may access current metrics 170a, from the metro-volume metrics 170, for the metro volume indicated by the request 222, and compare those metrics with the database 160 to identify a matching scenario. The metro-cluster manager 150 may then identify a particular end-metro procedure 350 associated with the matching scenario as the target procedure 350a and proceed to perform the target procedure 350a to satisfy the end-metro request 222.

Figure 5:
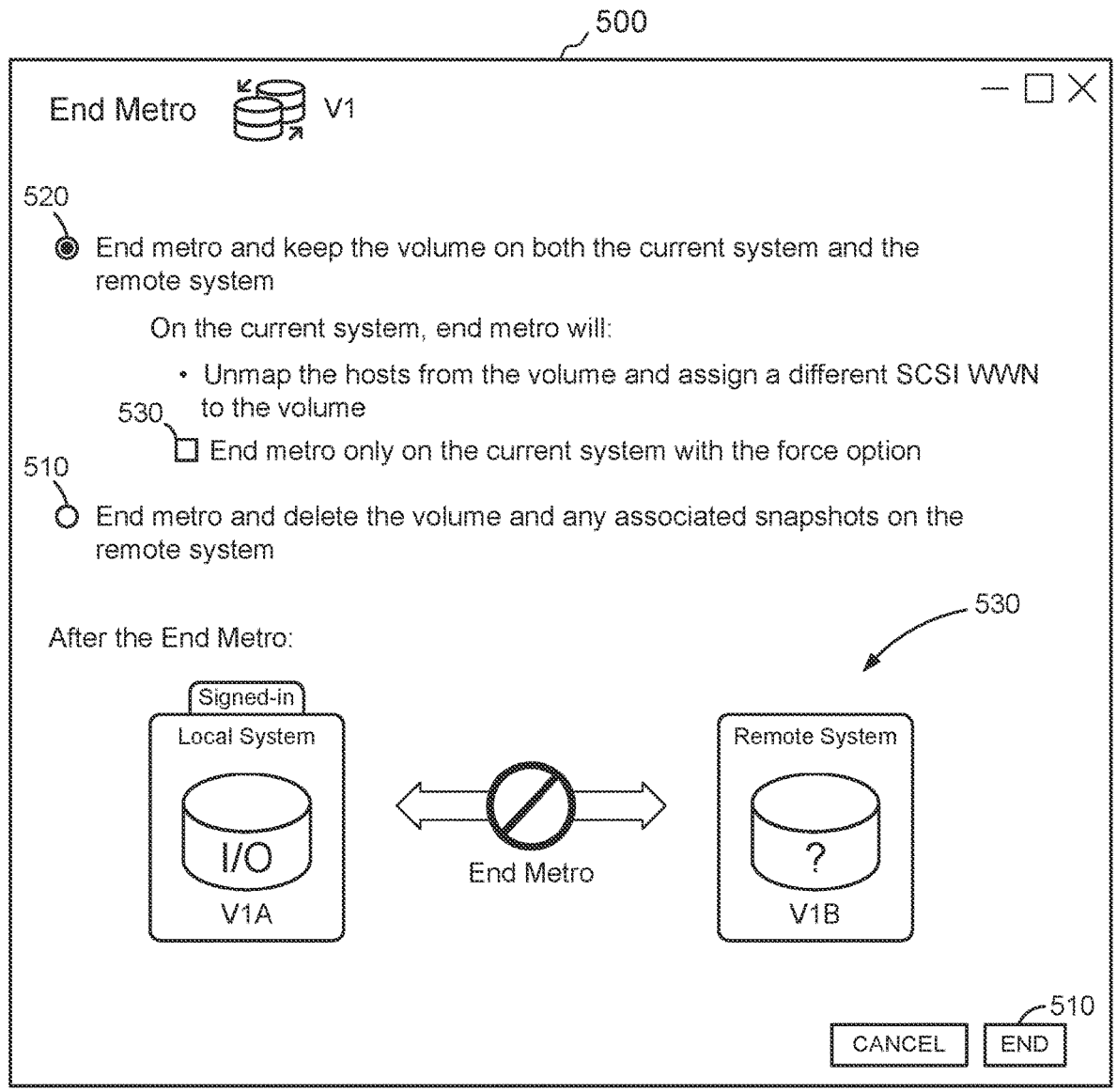
FIG. 5 is an example screenshot of an example metro user interface of FIG. 2.

FIG. 5 shows an example screenshot 500 of the GUI of the metro UI 180, which may be rendered, for example, by the metro client 220 while the metro client 220 is logged into the metro-cluster manager 150. The GUI includes a button 510, which the user may click to issue an end-metro request 222 on a specified metro volume, V1. The end-metro request 222 may be performed with certain options, such as an option 510 to "End metro and delete the volume and any associated snapshots on the remote system." Alternatively, the end-metro request 222 may be performed with option 520, to "End metro and keep the volume on both the current system and the remote system." If option 520 is selected, the end-metro request will "Unmap the hosts from the volume and assign a different SCSI WWN to the volume" on the current system, i.e., the array to which the metro client 220 is connected. If the user selects option 520 (which may be the default), the user may have the additional option to "End metro on the current system with the force option," which is described above with reference to FIG. 2.

The GUI may further show a state 530 of the metro volume after the end metro request 222 has completed. With the indicated settings, volume V1A will continue to be available from the local system (where the user is signed on), whereas the corresponding volume V1B on the remote system will be offline. Bidirectional replication will be disabled. Volume V1B on the remote system will have a new WWN and will be inaccessible to hosts.

Figure 6:
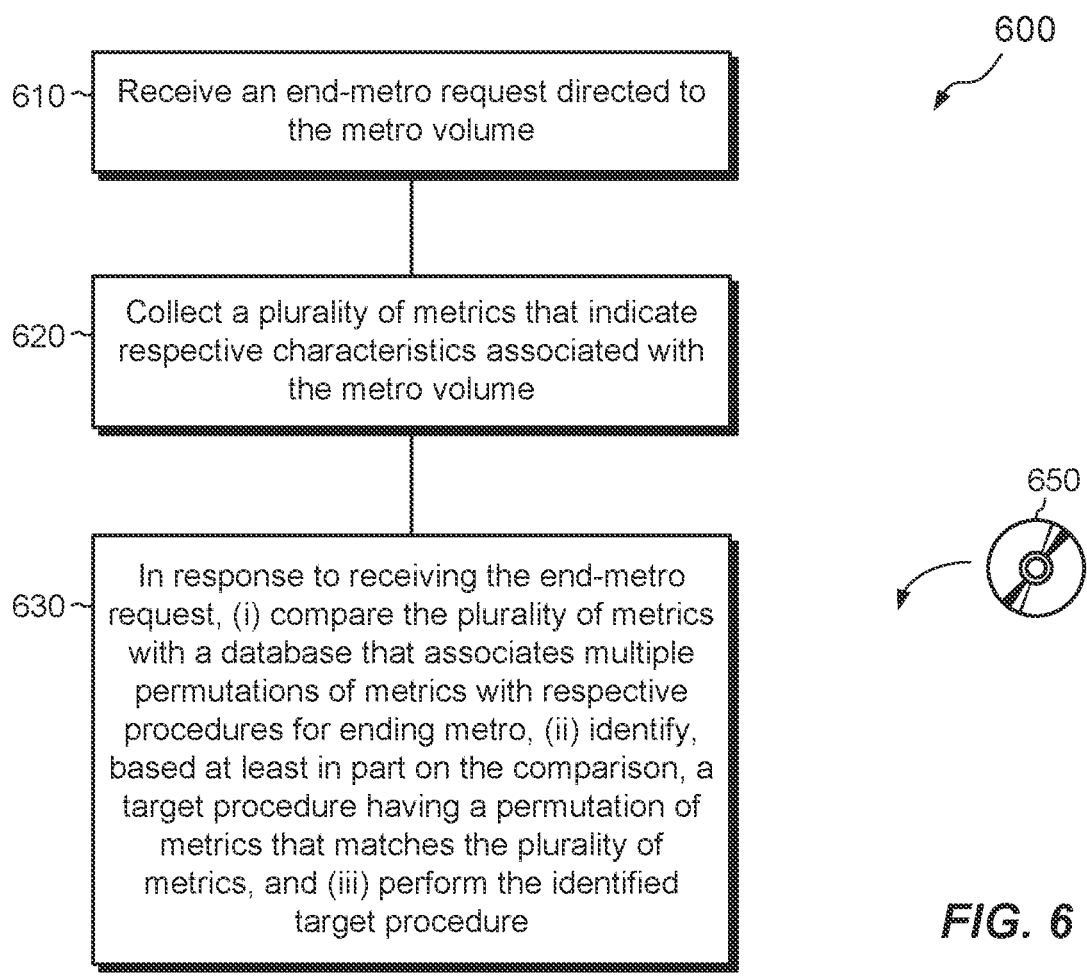
FIG. 6 is a flowchart showing an example method of ending metro-clustering on a metro volume.

FIG. 6 shows an example method 600 that may be carried out in connection with the environment 100 and provides a summary of some of the features described above. The method 600 is typically performed, for example, by the software constructs described in connection with FIG. 2, which reside in the memory 130 of a node 120 of an array 102 and are run by the set of processors 124. The various acts of method 600 may be ordered in any suitable way. Accordingly, embodiments may be constructed in which acts are performed in orders different from that illustrated, which may include performing some acts simultaneously.

At 610, an end-metro request 222 is directed to a metro volume (e.g., V1). The end-metro request 222 may be received by a node 120 on an array 102, for example.

At 620, a plurality of metrics 170a is collected. The metrics 170a indicate respective characteristics associated with the metro volume. For example, metrics for volume V1 may be collected and maintained in metro-volume metrics 170. Metrics 170a may be collected in real time, e.g., in response to the end-metro request 222, or they may be collected earlier and kept current by the metro-cluster manager 150.

At 630, in response to receiving the end-metro request 222, (i) the plurality of metrics 170a is compared with a database 160 that associates multiple permutations of metrics, e.g., permutations of 312, 314, 320, 332, 334, and 340, with respective procedures 350 for ending metro, (ii) based at least in part on the comparison, a target procedure 350a having a permutation of metrics that matches the plurality of metrics 170a is identified, and (iii) the identified target procedure 350a is performed.

An improved technique has been described for ending metro-clustering on metro volumes. The technique includes collecting a plurality of metrics 170a that indicate respective characteristics associated with a metro volume. In response to receiving a request 222 to end metro on the metro volume, the technique includes comparing the plurality of metrics 170a with a database 160 that associates multiple permutations of metrics with respective procedures 350 for ending metro. The technique further includes identifying, based on the comparison, a target procedure 350a having a permutation of metrics that matches the plurality of metrics 170a and implementing the target procedure 350a.

Having described certain embodiments, numerous alternative embodiments or variations can be made. For example, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of ending metro-clustering on a metro volume, comprising:
   receiving an end-metro request directed to the metro volume;
   collecting a plurality of metrics that indicate respective characteristics associated with the metro volume; and
   in response to receiving the end-metro request, (i) comparing the plurality of metrics with a database that associates multiple permutations of metrics with respective procedures for ending metro, (ii) identifying, based at least in part on the comparison, a target procedure having a permutation of metrics that matches the plurality of metrics, and (iii) performing the identified target procedure,
   wherein the metro volume is established between a first volume in a first array and a second volume in a second array, the first volume and the second volume configured to perform bidirectional replication, wherein performing the identified target procedure includes taking offline a selected volume, the selected volume being one of the first volume and the second volume, and wherein taking offline the selected volume includes changing a SCSI (small computer systems interface) identity of the selected volume.

2. The method of claim 1, wherein identifying the target procedure is further based at least in part on whether the end-metro request is received by the first array or the second array.

3. The method of claim 1, wherein the plurality of metrics includes a state of network connectivity between the first array and the second array.

4. The method of claim 3, wherein the plurality of metrics further includes (i) a state of host availability of the first volume and/or (ii) a state of host availability of the second volume.

5. The method of claim 3, wherein the end-metro request is received by a particular array, the particular array being one of the first array or the second array, and wherein identifying the target procedure is further based at least in part on a role of the particular array as a one of a preferred array or a non-preferred array.

6. The method of claim 3, wherein the end-metro request is received by the first array and includes a user-selectable option to delete the second volume in the second array.

7. The method of claim 6, wherein the user-selectable instruction to delete the second volume in the second array includes an instruction to delete all snapshots of the second volume in the second array.

8. The method of claim 6, wherein the state of network connectivity between the first array and the second array indicates a working connection, and wherein the identified target procedure includes failing the end-metro request responsive to the second array having more recent data of the metro volume than the first array and the user-selectable option being selected to delete the second volume in the second array.

9. The method of claim 3, wherein the identified target procedure is performed automatically without user intervention.

10. The method of claim 9, wherein the selected volume is the second volume and the second volume is a preferred volume, and wherein performing the identified target procedure includes switching roles of the first volume and the second volume, such that the selected second volume becomes a non-preferred volume before it is taken offline.

11. The method of claim 9, wherein taking offline the selected volume further includes:
    ending a bi-directional replication session between the first volume and the second volume; and
    disconnecting all hosts having host access to the selected volume.

12. The method of claim 3, wherein the end-metro request is received by the first array, wherein the state of network connectivity between the first array and the second array indicates a down connection, and wherein the end-metro request includes a user-selectable option to force the end-metro request to proceed on the first array even though the second array is unavailable.

13. The method of claim 1, wherein changing the SCSI identity includes changing a SCSI WWN (worldwide name) of the selected volume.

14. The method of claim 1, wherein taking offline the selected volume further includes terminating a local data protection policy on the selected volume.

15. The method of claim 1, wherein further comprising providing an acknowledgment of completion of the end-metro request, the acknowledgement provided only after completion of taking offline the selected volume.

16. The method of claim 15, wherein the end-metro request includes an option to delete the second volume, and wherein the acknowledgement is provided only after deletion of the second volume.

17. A computerized apparatus, comprising control circuitry that includes a set of processors coupled to memory, the control circuitry constructed and arranged to:
receive an end-metro request directed to a metro volume;
collect a plurality of metrics that indicate respective characteristics associated with the metro volume; and
in response to receipt the end-metro request, (i) compare the plurality of metrics with a database that associates multiple permutations of metrics with respective procedures for ending metro, (ii) identify, based at least in part on the comparison, a target procedure having a permutation of metrics that matches the plurality of metrics, and (iii) perform the identified target procedure,
wherein the metro volume is established between a first volume in a first array and a second volume in a second array, the first volume and the second volume configured to perform bidirectional replication, wherein the control circuitry constructed and arranged to perform the identified target procedure is further constructed and arranged to take offline a selected volume, the selected volume being one of the first volume and the second volume, and wherein the control circuitry constructed and arranged to take offline the selected volume is further constructed and arranged to change a SCSI (small computer systems interface) identity of the selected volume.

18. A computer program product including a set of non-transitory, computer-readable media having instructions which, when executed by control circuitry of a computerized apparatus, cause the computerized apparatus to perform a method of ending metro-clustering on a metro volume, the method comprising:
receiving an end-metro request directed to the metro volume;
collecting a plurality of metrics that indicate respective characteristics associated with the metro volume; and
in response to receiving the end-metro request, (i) comparing the plurality of metrics with a database that associates multiple permutations of metrics with respective procedures for ending metro, (ii) identifying, based at least in part on the comparison, a target procedure having a permutation of metrics that matches the plurality of metrics, and (iii) performing the identified target procedure,
wherein the metro volume is established between a first volume in a first array and a second volume in a second array, the first volume and the second volume configured to perform bidirectional replication, wherein performing the identified target procedure includes taking offline a selected volume, the selected volume being one of the first volume and the second volume, and wherein taking offline the selected volume includes changing a SCSI (small computer systems interface) identity of the selected volume.

19. The computer program product of claim 18, wherein the plurality of metrics includes a state of network connectivity between the first array and the second array.

20. The computer program product of claim 19, wherein the end-metro request is received by the first array, wherein the state of network connectivity between the first array and the second array indicates a down connection, and wherein the end-metro request includes a user-selectable option to force the end-metro request to proceed on the first array even though the second array is unavailable.

* * * * *